April 1, 1941.   G. A. UNGAR   2,236,980

LIQUID PUMP OR MOTOR

Filed Dec. 2, 1937   4 Sheets-Sheet 1

April 1, 1941.                G. A. UNGAR                2,236,980
                         LIQUID PUMP OR MOTOR
                       Filed Dec. 2, 1937        4 Sheets-Sheet 3

INVENTOR
Gustav A. Ungar
BY
ATTORNEY

April 1, 1941. G. A. UNGAR 2,236,980
LIQUID PUMP OR MOTOR
Filed Dec. 2, 1937 4 Sheets-Sheet 4

INVENTOR
Gustave A. Ungar
BY
ATTORNEY

Patented Apr. 1, 1941

2,236,980

UNITED STATES PATENT OFFICE 2,236,980

LIQUID PUMP OR MOTOR

Gustave A. Ungar, Pelham Manor, N. Y., assignor to Joseph F. Keller, New York, N. Y.

Application December 2, 1937, Serial No. 177,711

18 Claims. (Cl. 103—126)

My invention relates to balanced pumps or motors having cooperating rotary pistons employed in conjunction with a casing having inlet and outlet ports for the fluid, the pistons having cylindrical profiles consisting of a plurality of lobes or teeth which engage or mesh with one another.

Heretofore the various pumps and motors of this type either with relatively few lobes (Root type) or a larger number of lobes (gear pumps) have been satisfactory only for comparatively low pressures and speeds, owing to unbalanced transverse and axial forces. Furthermore the necessity of close clearances between the stationary end covers and revolving rotors limited the operation to comparatively narrow temperature limits owing to differences in the axial expansion of housings and rotors due to heat. Attempts have also been made to balance spur gear pumps but they have resulted in excessive leakage between the intake and discharge sides.

Pumps of the straight spur gear type, owing to the fact that the liquid is trapped between the interstices of meshing teeth, develop high fluid pressures in these pockets, unless excessive clearances are provided or complicated pressure relieving devices are employed.

One of the objects of my invention is to provide novel means to balance the transverse hydraulic forces acting upon the cooperating rotors of lobe type or gear pumps.

Another object of my invention is to provide novel means to provide the revolving rotors with revolving side walls and with stationary side walls which are capable of floating with the axially balanced rotors, thereby eliminating narrow temperature limitations.

Another object of my invention is to provide means for securing a safety bypass when the outlet of the pump or motor is closed.

Another object of my invention is to provide simple means to prevent the trapping of liquid between the teeth of the straight spur gear type of pumps or motors.

Another object of my invention is to provide means for substantially eliminating the pulsations in the liquid flow present with straight lobe and spur gear type of pumps.

There are other objects of my invention which, together with the foregoing, will appear in the detailed description which is to follow in connection with the drawings in which.

In the form shown in Figs. 1 to 5 the casing consists of the main portion 30 with the two end members 31 and 32. The part 32 in effect constitutes the base of the pump which supports the driving shaft 33. The part 30 is secured to the part 32 by a number of cap screws or bolts 34 and the end cap or cover plate 31 is secured to the intermediate main part 30 by means of a number of screws or bolts 35.

Figure 1:
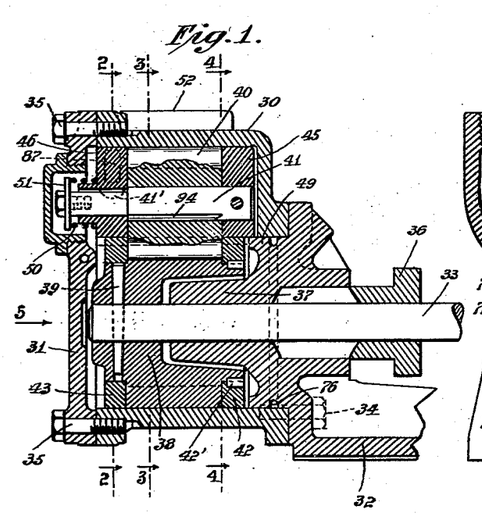
Fig. 1 is a longitudinal section of a straight spur gear type of pump or motor embodying my invention.

A suitable type of stuffing box or gland 36 is provided for the shaft. In order to make the device as compact as possible the base member 32 has a sleeve portion 37 which extends inwardly into the pump member 38 which latter is secured to the shaft 33 in a suitable manner for instance by key 39. This driving member 38 of the pump may have any number of straight teeth of suitable profile.

The other gear member 40 of the pump is, of course, provided with teeth which mesh with the teeth of the main drive gear 38 and is itself rotatably mounted upon a stationary shaft 41.

Instead of having the teeth of the gears extend longitudinally of the shafts up to the end walls of the casing as is customary in pumps of this general character, I have instead provided abutment members which are independent of the adjacent walls of the casing and in effect constitute the true end walls of the pumping cylinders. One pair of the abutment members rotates with the shaft and pump member with which it is associated and the other pair of abutment members are held stationary. One abutment member is yieldable longitudinally of the axis of the adjacent gear or pump members. The abutments 42 and 43 are arranged concentrically of the shaft 33 and form the end abutments for the gear member 38 with which they rotate.

The ring member 42 is fastened to the body of the gear member 38 in any suitable manner, as for instance by means of a number of screws or pins 42'. The ring member 43 is similarly secured to the opposite end of the gear body 38. It will be understood, of course, that the chamber 44 in the casing 30 is cylindrical in form and permits of minimum clearance for the teeth of the body of the gear member 38. The ring members 42 and 43 fit with but close clearance in this same cylinder chamber 44. The abutment members 45 and 46 for the driven gear of the pump are keyed or pinned to the shaft 41 and are held stationary in the chamber 47 in which the gear 40 revolves.

Figure 8:
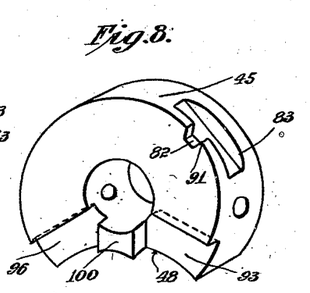
Fig. 8 is a perspective view of an abutment member shown in Figs. 1 and 2.
Figure 9:
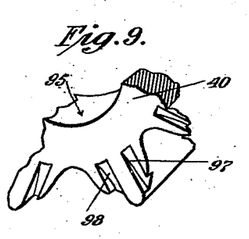
Fig. 9 is a fragmentary perspective view of pinion teeth of Figs. 1 and 3.
Figure 10:
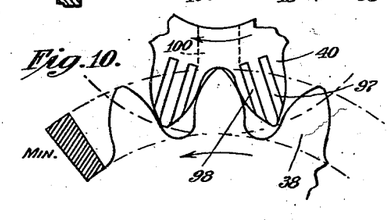
Fig. 10 is a fragmentary view, partly diagrammatic, showing one position of meshing of the teeth.
Figure 11:
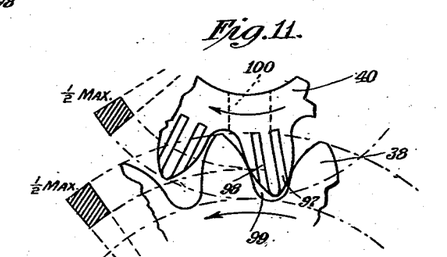
Figs. 11, 12 and 13 are similar views showing the teeth in other positions.
Figure 12:
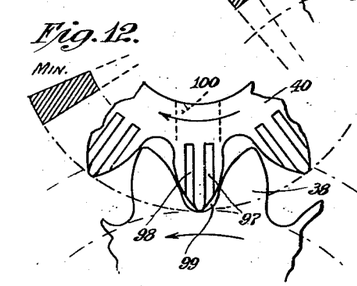
Figure 13:
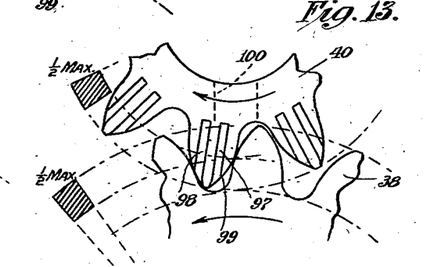

Fig. 8 shows the peculiar shape of the abutment member 45, the lower part of which at 48 is cut away and provided with a concave cylindrical surface which fits on the periphery of the ring 42 and also overlaps a portion 49 on the end member 32. The ring member 46 is shaped similarly to the ring member 45 just described and rests on the periphery of the ring 43. It is also mounted on the shaft 41 so as to slide longitudinally of the shaft along key 41'. Normally the ring 46 is pressed against the shoulder shown on the shaft 41 by a spring 50 which presses against the head of the abutment washer or screw 51.

Figure 3:
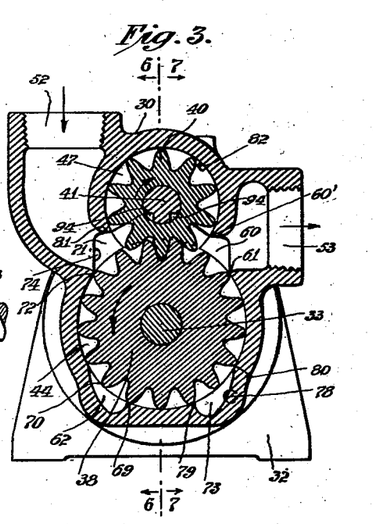
Fig. 3 is a cross section through 3—3 of Fig. 1.

It will be understood that liquid is drawn in at 52 and forced from the outlet 53 by the rotation of the gears in the direction of the arrows shown in Fig. 3.

From the foregoing it will be seen that the end walls or abutments of the pump chambers may be set to fit closely against the gears and that the parts may expand and contract without causing binding or leakage since there is sufficient clearance outside of the abutment rings and within the casing to permit expansion and contraction without altering the close fit of the walls of the pump chamber.

By providing for the resilient longitudinal movement of one or more of the end walls such as 46 it is possible to provide a relief for excessive pressure that may be built up in the pressure side of the pump, for instance by sudden stoppage or closing of a valve or the like which might otherwise destroy some part of the mechanism. This eliminates the necessity for an external relief valve or safety chamber.

It will be noted that when the pressure of liquid in the cylinder moves the end abutment 46 away from the gear 40, that a space is opened up between the gear and the ring 46 so that liquid is free to travel from the outlet side back to the inlet side of the pump, thus instantly relieving the pressure in the cylinder.

In the operation of pumps and motors of this character it is well known that there are substantial unbalanced pressures radially of the axes of the gears which pressure causes chattering, vibration and destructive wear as well as locking of the gears when operating as a motor. To avoid or prevent this objectionable action are provided means for balancing the pressures and, so to speak, causing the gears to float in the cylinder without excessive leakages which have been present in previous attempts of balancing.

Figures 2, 4, 5:
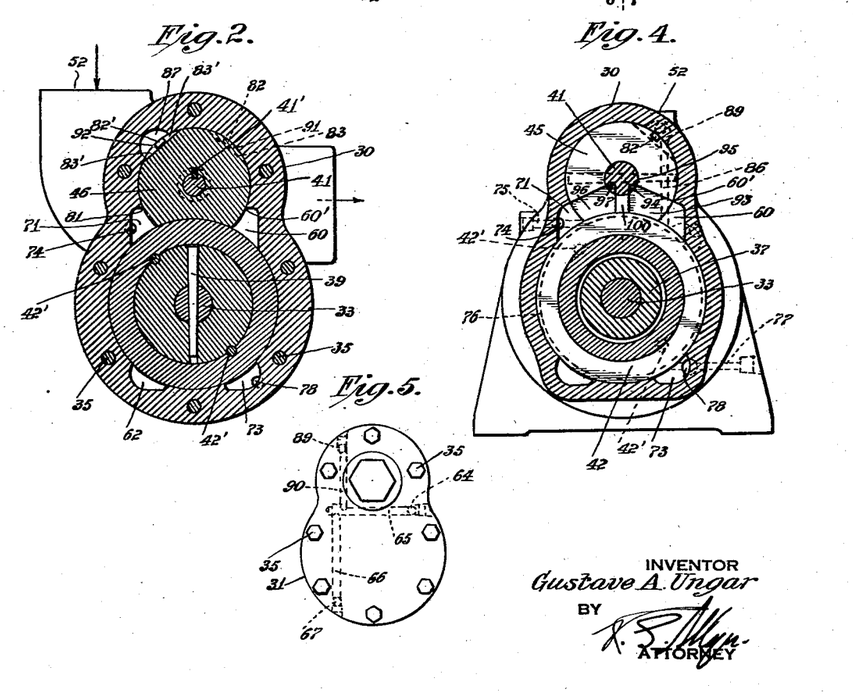
Fig. 2 is a cross section through 2—2 of Fig. 1.
Fig. 4 is a cross section through 4—4 of Fig. 1.
Fig. 5 is an end view of the parts shown in Fig. 1 but on a smaller scale.
Figure 6:
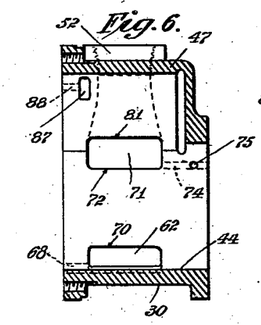
Fig. 6 is a longitudinal section of the pump casing shown in the preceding figures but on a smaller scale, the section being taken on the plane of the line 6—6 of Fig. 3 looking in the direction of the arrows.
Figure 7:
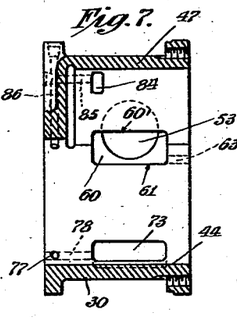
Fig. 7 is a similar section taken generally on the plane of the line 7—7 of Fig. 3.

The liquid emerging from the outlet 53 is under pressure, which exerts a reactance force upon pump rotor 38 approximately proportional to an area with a length equal to the axial length of outlet port 60 and a width equalling the distance from the line of intersection of rotors 38 and 40 to edge 61 of port 60. The axial length of port 60 is slightly more than the length of rotor 38, in order to provide an unrestricted opening for the passage of the liquid. The pressure acting upon rotor 38 from port 60 is counterbalanced by a force exerted upon rotor 38 in opposite direction from port 62, which is subjected to the same liquid pressure as port 60 by means of the following connections as shown in Figs. 5, 6 and 7. Port 60 (Fig. 7) has an axial passage 63 which opens into a short axial passage 64 in cover 31 (Fig. 5). Passage 64 connects with transverse passage 65, which in turn connects with vertical passage 66. Passage 66 is connected with a short inward axial passage 67 which in turn leads into passage 68 which opens into port 62 (Fig. 6).

The axial length of port 62 is equal to that of port 60 and its width 69—70 is equal to the distance from the line of intersection of the outer circumferences of rotors 38 and 40 to the edge 61 of port 60.

The liquid pressure or vacuum prevailing at the inlet port 52 acts upon rotor 38 with a pressure approximately proportional to an area with a length equal to the axial length of port 71, which is slightly longer than rotor 38, and a width equalling the distance from the line of intersection of rotors 38 and 40 to edge 72 of port 71.

The counterbalancing force upon rotor 38 is duced by one part offset those produced by the other part.

Figure 14:
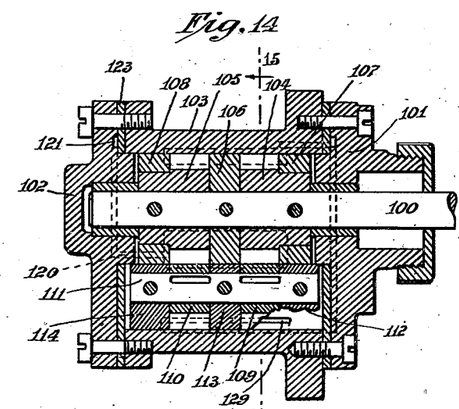
Fig. 14 is a longitudinal section of another straight spur gear type of pump embodying my invention, also providing a uniform flow of liquid.
Figure 15:
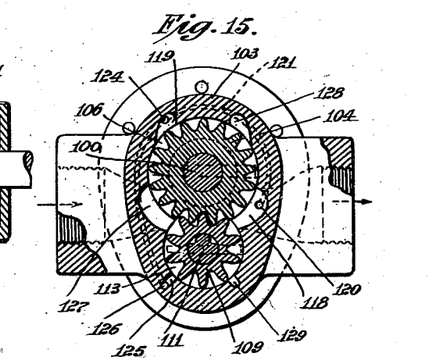
Fig. 15 is a cross section through 15—15 of Fig. 14.

Figs. 14 and 15 illustrate one form of this improvement. The drive shaft 100 has bearings in the end pieces 101 and 102 which are secured to the pump casing 103. This shaft 100 carries the two straight spur gear members 104 and 105 which are separated by the rotary abutment 106 and is provided with rotary end abutments 107, 108 corresponding to abutments 42 and 43. Straight spur gear members 109, 110 are supported on a stationary countershaft 111 which carries the stationary abutments 112, 113 and 114 corresponding to abutments 45 and 46.

Figure 16:
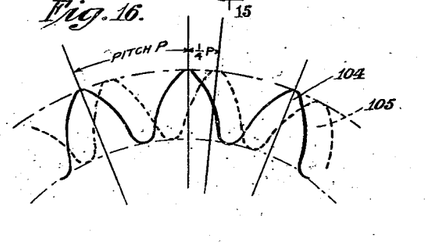
Fig. 16 is an enlarged detail of teeth of Figs. 14 and 15.
Figure 17:
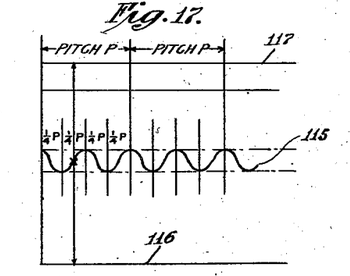
Fig. 17 is a diagrammatic view showing the balancing of the pressure fluctuations resulting from the action of the mechanism shown in Figs. 14, 15 and 16.

The teeth on gear 104, 105 are offset one-fourth the circumferential pitch as indicated in Fig. 16. The curve 115 in Fig. 17 indicates the pulsation in the delivery from the two pairs of the pump gears. From line 116 to the curve represents the delivery from one pair of rotors and from line 117 to the curve represents the delivery from the other pair of rotors. The distance from 116 to 117 represents the total delivery which is substantially constant or free of pulsations.

The radial balance of the hydraulic forces acting on gear members 104 and 105 is accomplished in a manner similar to that used for gear member 38. The pressure from outlet port 118 is connected to balancing recess 119 by means of axial passage 120 which connects with groove 121 in cover 102 which is made into a passage by means of cover plate 123. Axial passage 124 connects groove 121 with recess 119. Groove 121 is also connected to axial recess 125 by means of passage 126, thereby establishing balancing pressure for gear members 109 and 110. In a similar manner inlet port 127 is connected with recesses 128 and 129 thereby providing the required balancing forces for the pressure or suction which exists in inlet port 127.

Figure 18:
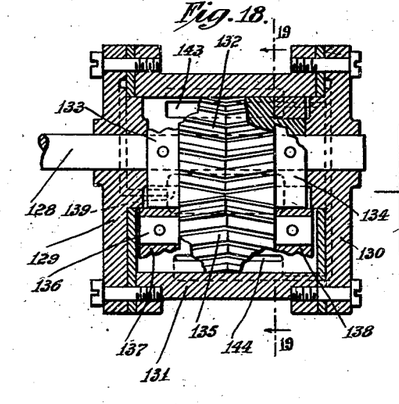
Fig. 18 is a longitudinal sectional view of another modification of my invention showing spur gears of the double helical or herring-bone type.
Figure 19:
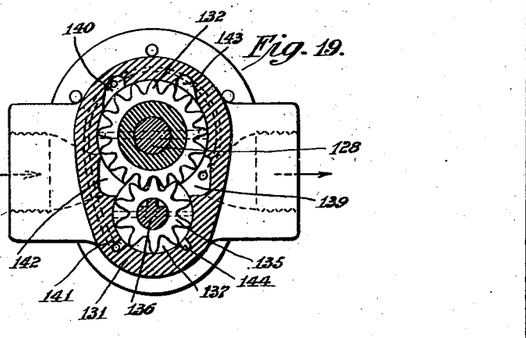
Fig. 19 is a cross section through 19—19 of Fig. 18.

In the embodiment of my invention shown in Figs. 18 and 19 the pulsations in the rate of delivery of the gear members are equalized by the employment of helical or double helical (herringbone) gears.

The drive shaft 128 has bearings in the end pieces 129 and 130 which are secured to the pump casing 131. This shaft carries gear member 132 and two rotating end abutments 133 and 134 corresponding to abutments 42 and 43. Gear member 135 is supported on stationary countershaft 136, which carries stationary abutments 137 and 138, corresponding to abutments 45 and 46.

In order to avoid axial unbalance of the gear members my preferred form employs double helical gear teeth. The lead of the gear helix is made equal to the circumferential pitch of the gear members, thereby insuring the entire elimination of pulsations and also perfect meshing of the gear teeth. The balancing of the radial forces acting upon the gear members as a result of hydraulic pressure in outlet port 139, is accomplished in the same manner as described for the embodiments Figs. 14 and 15 by connecting port 139 with axial recesses 140 and 141 and the forces due to hydraulic pressure or suction in port 142 are balanced by connecting port 142 with axial recesses 143 and 144.

In order to overcome the volumetric limitations resulting from the employment of geared rotors with a sufficiently large number of teeth to insure correct gear mesh and to produce radial hydraulic balance, the embodiment of my invention shown in Figs. 20 to 27 is used. This embodiment also eliminates trapped liquid which exists with straight gear pump teeth of conventional design.

The volumetric capacity of gear or lobe type rotary pump is substantially a function of the area of the outside circle of the gears minus the area of the root circle, times the acting width of the gear member. With gears having enough teeth to insure proper meshing and hydraulic radial balance the area of the root circle is only a little less than the area of the outside circle and therefore a considerable portion of the possible volumetric pump capacity is lost. By employing only a few teeth or lobes in each rotor it is possible to reduce the root diameter which results in a greatly increased volumetric delivery for the same rotor outside diameter. When reducing the number of gear teeth or lobes to a few, it is no longer possible to utilize the gear members themselves for the radial balance of the hydraulic pressures. The balancing of these radial hydraulic forces is here accomplished by means of balancing pressure applied to the abutments rotating with the gear members.

Figure 20:
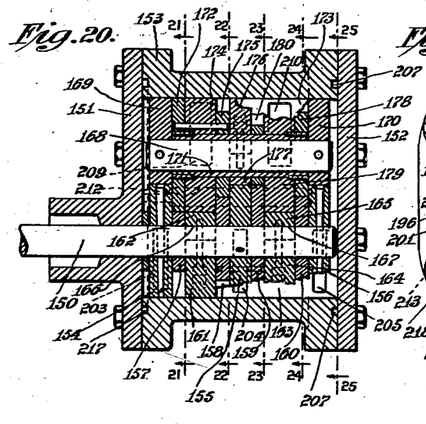
Fig. 20 is a longitudinal section of a lobe type of pump embodying my invention.

The driving shaft 150 has bearings in the end pieces 151 and 152 which are secured to the pump casing 153. The shaft 150 carries rotary abutments 154, 155 and 156. Pump rotor member 157 is attached to abutment 154, rotor members 158 and 159 are attached to abutment 155 and rotor member 160 is attached to rotary abutment 156. Rotor members 157 and 158 are separated by stationary two-piece abutment unit 161, 162 which is shown in greater detail in Figs. 26 and 27. The two parts 161 and 162 are detachably fastened together and they fit with their convex surface into the cylindrical pump chamber 163.

Rotor members 159 and 160 are separated by stationary two piece abutment unit 164, 165 of the same shape as abutment unit 161, 162. Shaft 150 has additional bearings in cylindrical hole 166 of abutment unit 161, 162 and in hole 167 of abutment unit 164, 165.

The stationary countershaft 168 has fastened to it stationary end abutments 169 and 170 corresponding to abutments 45 and 46. Rotatably mounted on shaft 168 between abutments 169 and 170 and providing a bearing on shaft 168 is sleeve 171. Fastened to sleeve 171 is pump rotor member 172, which revolves in the cylindrical pump chamber 173. Attached to pump rotor member 172 is rotary abutment 174 to which in turn is fastened pump rotor member 175. Sleeve 171 passes through the central bearing opening of stationary two-piece abutment 176—177, which is of similar construction as 161—162. To the left of stationary abutment 170 is pump rotor member 178 fastened to sleeve 171. Attached to 178 is rotary abutment 179 and attached to 179 is pump rotor member 180. Pump rotors 172, 174, 180 and 178 therefore rotate as one unit with rotary abutments 174 and 179 and together with sleeve 171. The rotary abutments of one rotor group fit into the concave recesses of the stationary abutments of the other rotor group.

Each set of cooperating or meshing rotor members therefore forms a separate pump unit, the side walls of which are formed by the adjacent abutments.

The rotor members shown have, for instance, four lobes or teeth although three or two lobes could be used without departing from the spirit of my invention. In order to provide an uninterrupted and uniform driving force for the driven pump rotor member group which is mountexerted from port 73, which is connected to port 71 in the following manner. As shown in Fig. 6 passage 74 extends outwardly from port 71 and connects with the horizontal passage 75. Passage 75 connects with the circular grooved passage 76 (Fig. 1) on the cylindrical part 49 of the end member 32. Inwardly leading toward grooved passage 76 is a passage 77 (Figs. 4 and 7) in housing 30. Passage 77 in turn leads into axial passage 78 which connects with port 73.

The axial length of port 73 is equal to that of port 71 and its width 79—80 is equal to the distance from the line of intersection of rotors 38 and 40 to the edge 72 of port 71.

In order to prevent leakage between ports 62 and 73, distance 69—79 is made equal to two circular tooth pitches plus the width of the tooth edge and always overlaps at least a part of three teeth. This insures that at all times there are the cylindrical edges of at least two teeth to provide a seal between the different pressures of ports 62 and 73.

In the embodiment of my invention shown in Figs. 1 to 13 the driven rotor 40 has a smaller number of teeth than the driving rotor 38. This reduces the size of the pump or motor since its output or the delivered liquid volume depends only upon the size of driving rotor 38 and its speed.

The balancing of the radial hydraulic forces acting upon rotor 40 therefore necessitates a certain modification over those employed for rotor 38. The pressure or suction in inlet port 71 acts upon the rotor with a force approximately proportional to an area having a length equal to the axial length of rotor 40 and a width equal to the distance from the line of intersection of rotors 38 and 40 to the edge 81 of port 71 (Figs. 3 and 6).

A partial counterbalance of this force is exerted upon rotor 38 from pressure admitted in approximately opposite direction to the force from port 71, by the slot 82 in abutment 45. Slot 82 leads into a groove 83 of abutment 45 (see Fig. 8). The axial width of groove 83 is substantially smaller than the width of abutment 45 so as to prevent leakage. Groove 83 connects with a recess 84 in housing 30 (Fig. 7). Recess 84 has substantially the same surface dimensions as groove 83. Recess 84 is connected through axial passage 85 with vertical passage 86 which in turn communicates with the circumferential groove 76 in end-member 32, thereby establishing connection with port 71 through the passages which were previously described.

The pressure in outlet port 60 acts upon rotor 40 with a radial force approximately proportional to an area having a length equal to the axial length of rotor 40 and a width equal to the distance from the line of intersection of rotors 38 and 40 to the edge 80' of port 60.

A partial counterbalance of this force is exerted upon rotor 38 from pressure admitted in approximately opposite directions to the force from port 60 by the slot 82' in abutment 46 (Fig. 2). Slot 82' is located on the side of abutment 46 which faces rotor 40 and leads into groove 83' on the surface of abutment 46. The arrangement of slot 82' and groove 83' is similar to slot 82 and groove 83 of port 45 shown in Fig. 8. Slot 83' connects with recess 87 of housing 30, (Fig. 6). Axial passage 88 connects recess 87 wtih short axial passage 89 in cover 31 (Fig. 5). Passage 89 is connected with vertical passage 90, which in turn leads into horizontal passage 65, thereby completing the connection with port 60, as previously described.

The distance separating slots 82 and 82' is also made equal to that of the distance along the cylindrical outside edge of three teeth or equal to two circular tooth pitches plus the width of two tooth edges. This again insures that at all times the cylindrical edges of at least two teeth provide a seal between the pressure differences of slots 82 and 82'. For the same reason the distance between edge 91 of slot 82 and edge 80' of port 60 as well as the distance between edge 92 of slot 82' and edge 81 of port 71 are also equal to two circular tooth pitches plus the width of two tooth edges.

It will be seen that therefore the width of slots 82 and 82', owing to the relatively small size of rotor 40, must of necessity be small, for instance equal to about twice the width of the tooth edge. The balancing forces will therefore be proportional to an area with a length equal to the axial length of gear 40 and a width varying from one to two circular tooth pitches.

In order to provide an additional balancing force, port 60 is connected through recess 93 in abutment 45 to groove 94 extending axially along the length of gear 40 in shaft 41. This permits pressure to act on the inside bore 95 of rotor 40 in approximately opposite direction to the force exerted on rotor 40 from port 60.

In the same manner, recess 96 in abutment 45 connects port 71 with axial groove 97 in shaft 41, thereby creating a supplementary balancing force in approximately opposite direction to the force exerted on rotor 40 from port 71.

In order to avoid the necessity of excessive clearances between the teeth of gears 38 and 40 which are ordinarily necessary with the employment of straight spur gear type rotors, owing to excessive pressure rises, due to the trapping of liquid between the meshing gear teeth, the faces of gear rotor 40 are provided with radial recesses or pockets 97 and 98 (see Figs. 9 to 13). As the gear rotors travel from the position shown in Fig. 10 through those shown in Figs. 11, 12 and 13 the liquid which would ordinarily be trapped in the tooth cavity 99, can now freely escape through the recesses 98 and 97 and from there to the recess 93 or 96 in abutment 45 as the case may be, and it can also escape on the other face of gear 40 into similar surface recesses of abutment 46 corresponding to recesses 93 and 96 of abutment 45. Abutment 45 has a central ridge portion 100 having its surface in the same plane as the flat side of abutment 45.

Portion 100 is of sufficient width to seal the pressure difference of the liquid between ports 60 and 71 and it also permits the liquid in cavity 99 to escape into recesses 96 or 93 respectively without opening any direct passage of liquid from port 60 to port 71.

In the gear or lobe type rotary pump as above described there is inherently a certain fluctuation or pulsation in the rate of delivery. The momentary rate of delivery of such pumps, being composed of the sum of the deliveries of both rotors, varies with the different meshing positions of the rotors from a minimum to a maximum. The value of these minimum and maximum rates of delivery is diagrammatically indicated in Figs. 10, 11, 12 and 13 by "Min." and "Max." To eliminate or minimize such pulsations I may divide the pump members into two or more parts whose teeth are circumferentially offset with respect to each other so that in effect the pulsations proed on sleeve 171, the four sets of cooperating rotor members are displaced against one another by one quarter pitch. With four teeth or lobes, the rotor displacement, expressed in degrees, is 22½° as shown in Figs. 21, 22, 23 and 24. The profile of the rotor lobes consists for a little more than one quarter pitch (22½°) of a true involute profile (see Fig. 28) 181—182, which meshes with a corresponding involute profile of the other gear member along a straight line of tooth action 183, 184, 185. The remaining lobe profile curves 181—186 and 182—187 are chosen as complementary rolling profiles of the two pump rotors, which provide curved lines of tooth action 185—188 and 183—189 whose successive contact points act merely as liquid seals and are not and cannot be used for driving the rotor members.

Just before pump rotor members 158—175 have rotated in the direction of the arrows until they contact at 185 of the straight line of action, pump rotor member 157 has come into driving mesh with rotor member 172. For a little more than 22½° rotor member 157 drives 172; after 157 the driving is done by 160 and finally by 159. This completes an uninterrupted and uniform driving cycle of 90°. The cycle is continued with the next set of rotor member teeth in the same sequence of the driving rotors 158, 157, 160 and 159.

Figures 21, 28, 30:
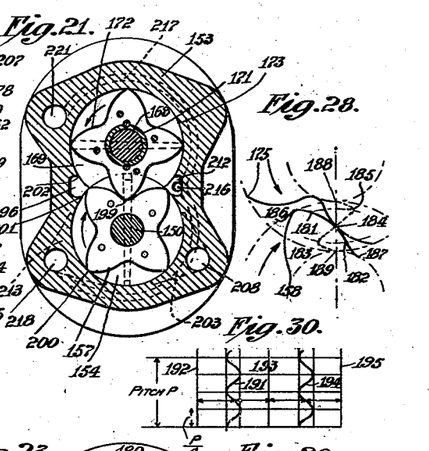
Fig. 21 is a cross section through 21—21 of Fig. 20.
Figs. 28 and 29 are diagrammatic views showing the meshing of the teeth or lobes of the forms shown in Figs. 20 to 25.
Fig. 30 is a diagrammatic view illustrating the equalization of the fluctuations of the liquid flow caused by the rotors of the form shown in Figs. 20 to 25.
Figure 22:
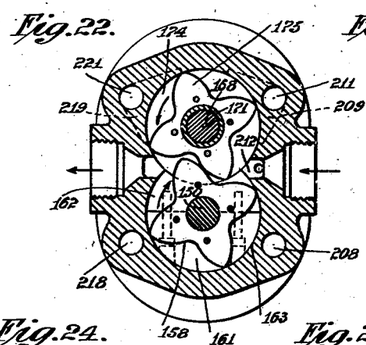
Fig. 22 is a cross section through 22—22 of Fig. 20.
Figures 23, 29:
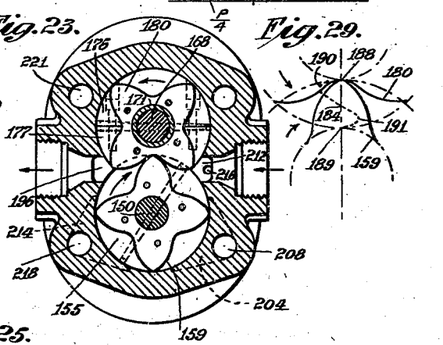
Fig. 23 is a cross section through 23—23 of Fig. 20.
Figure 24:
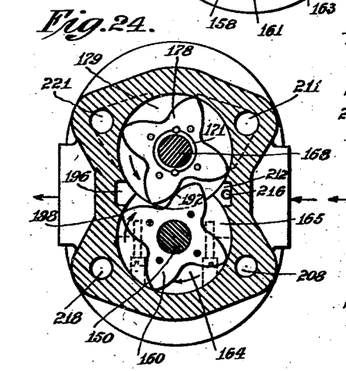
Fig. 24 is a cross section through 24—24 of Fig. 20.
Figures 25, 27:
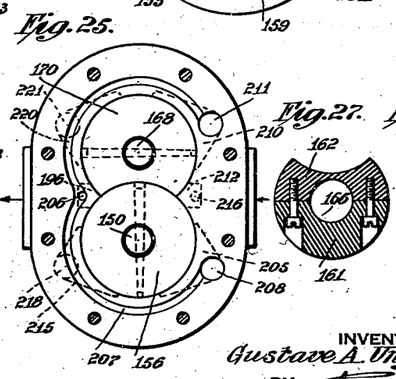
Fig. 25 is a cross section through 25—25 of Fig. 20.
Figs. 26 and 27 are edge and sectional views of parts of the form shown in Figs. 20 to 25 inclusive.
Figure 26:
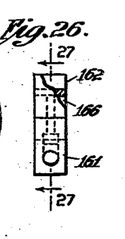

As will be seen in Figs. 28 and 29, there is no trapping of liquid between the cooperating pump rotor since there is always only one point of contact either along line of action 188, 185, 184, 183, 189 (Fig. 28) or along line of action 188, 190, 184, 191, 189 (Fig. 29).

The displacement of two pairs of cooperating rotor units by one quarter pitch also has the result of offsetting the pulsations in the rate of delivery of each of these cooperating rotor units. Curve 191 in Fig. 30 indicates the pulsations in the delivery from one pair of rotor units. From line 192 to curve 191, the abscissae represent the delivery of one pair of rotors (151 and 172) from curve 191 to line 193 the abscissae represent the delivery of the next pair of rotors (158 and 175). From line 193 to curve 194 the abscissae represent the delivery of rotors 159 and 180 and from curve 194 to line 195 the abscissae represent the delivery of rotors 160 and 178. The distance from 192 to 195 represents the total delivery of all four pairs of rotors, which is substantially constant or free from pulsations.

The balancing of the radial forces acting upon the rotor members is accomplished in the following manner.

The hydraulic pressure in outlet port 196 exerts a radial force upon the revolving parts mounted on drive shaft 150 approximately proportional to an area with a length equal to the total length of all four rotor members and a width equalling the distance from the point where the rotors contact with each other to the contact point of the rotor with the cylindrical pump housing 163. This distance varies from a minimum approximately indicated by 197—198 in Fig. 24 to a maximum approximately indicated by 199—200 in Fig. 21. An additional constant radial force acting on rotor abutment 155 is exerted on the rotating group mounted on shaft 120, being proportional to an area having the length of rotary abutment 155 and a width equal to width 201—202 of port 196. Recesses 203, 204 and 205 in cylindrical pump housing 163 are arranged in approximately the same planes as rotary abutments 154, 155 and 156, but their width is sufficiently smaller than the width of the abutments so as to prevent pressure loss by lateral leakage. They are connected to outlet port 196 through axial passage 206, groove 207 and axial hole 208, which extends from groove 207 through recesses 205 and 204 to recess 203. The circumferential length of recesses 203, 204 and 205 is such as to produce a hydraulic radial balancing force equal to the mean hydraulic radial force on the driving rotor group exerted from port 196.

The hydraulic force from port 196 on driven rotor group, mounted on sleeve 171 is balanced in a similar manner through hydraulic radial forces exerted upon rotary abutments 174 and 179 from recesses 209 and 210 respectively, which are connected to groove 207 through hole 211 which extends from groove 207 through recess 210 to recess 209. The width of recesses 209 and 210 is sufficiently smaller than that of rotary abutments 174 and 179 so as to prevent leakage loss and the circumferential length is such as to produce a hydraulic radial balancing force equal to the mean hydraulic radial force acting on the driven rotor group from port 196.

The intake port 212 is connected to recess 213 behind rotary abutment 154, to recess 214 behind rotary abutment 155 and to recess 215 behind rotary abutment 156 by means of axial passage 216, groove 217 and hole 218 and it is also connected to recess 219 behind rotary abutment 177 and recess 220 behind rotary abutment 179 by means of axial hole 221 which leads into groove 217. This produces a mean balancing force for the radial hydraulic forces acting upon the driving and driven rotor groups from intake port 212 due to suction or pressure.

In Figs. 1 through 19 of the drawings, it will be seen that the angular separation of any two adjacent ports (either counterbalancing or pumping ports), is not less than two nor more than three tooth pitches. It will also be seen that each counterbalancing port is of less width than its connected pumping port by not more than one tooth pitch. When the teeth are few the width of a counterbalancing port becomes smaller and a supplemental counterbalancing port within the rotor as described becomes desirable.

I claim:

1. In a device of the class described the combination with a casing having connected chambers, of a rotary driving shaft and toothed member in one chamber, the shaft being provided with bearings connected to said casing, a stationary shaft on which is mounted a toothed driven member located in another chamber and meshing with the first toothed member, rotatable abutment members on the driving shaft rotatable therewith and substantially contiguous each end of the first mentioned toothed member, said rotatable abutment members with their included toothed member being adapted for limited axial movement within its chamber, stationary abutments secured to said stationary shaft substantially contiguous the ends of the second mentioned toothed member and within said second mentioned chamber, said stationary abutments being recessed to receive the rotatable abutment members, the stationary shaft, its abutments and toothed member being also adapted for axial movement within its chamber with any axial movement of the first mentioned tooth member unit, the rotatable abutment members and the stationary abutments each being of a diameter to close the spaces between the teeth of its contiguous toothed member.

2. In a device of the class described the combination with a casing having connected chambers, of a rotary shaft and toothed member in one chamber, rotatable abutment members secured to and rotatable with said shaft substantially contiguous the ends of the toothed member and within said chamber, a stationary shaft on which is mounted a rotatable toothed member in another chamber, a stationary abutment substantially contiguous each end of said second mentioned toothed member and secured to said stationary shaft between an end of the second mentioned chamber and its toothed member, the stationary abutments being recessed to receive the rotatable abutment members, said abutments and abutment members each being of a diameter to close the spaces between the teeth of the contiguous toothed member, said toothed members, abutments and abutment members and rotatable shaft being adapted for limited axial movement within said chambers, the inner faces of adjacent stationary abutments and rotatable abutment members being maintained in substantially the same plane.

3. In a device of the class described the combination with a casing having connected chambers, of a rotary shaft and toothed member in one chamber, rotatable abutment members secured to and rotatable with said shaft substantially contiguous the ends of the toothed member and within said chamber, a stationary shaft on which is mounted a rotatable toothed member in another chamber, a stationary abutment substantially contiguous each end of said second mentioned toothed member and secured to said stationary shaft between an end of the second mentioned chamber and its toothed member, the stationary abutments being recessed to receive the rotatable abutment members, said abutments and abutment members each being of a diameter to close the spaces between the teeth of the contiguous toothed member, said toothed members, abutments and abutment members and shafts being adapted for limited axial movement within said chambers, the chamber containing the stationary shaft being provided with a pressure compensating recess in the peripheral wall thereof, at least one of the stationary abutments having peripheral and side ports through which fluid pressure may be supplied to said pressure compensating recess.

4. In a device of the class described the combination with a casing having connected chambers, of a rotary shaft and toothed member in one chamber, rotatable abutment members secured to and rotatable with said shaft substantially contiguous the ends of the toothed member and within said chamber, a stationary shaft on which is mounted a rotatable toothed member in another chamber, a stationary abutment substantially contiguous each end of said second mentioned toothed member and secured to said stationary shaft between an end of the second mentioned chamber and its toothed member, the stationary abutments being recessed to receive the rotatable abutment members, said abutments and abutment members each being of a diameter to close the spaces between the teeth of the contiguous toothed member, said toothed members, abutments and abutment members and shafts being adapted for limited axial movement within said chambers, a shoulder on said stationary shaft adjacent an end of the toothed member carried thereby, at least one of said stationary abutments being contiguous to both said toothed member and said shoulder on said stationary shaft, and a spring cooperating with said stationary shaft and abutment and pressing the abutment against said shoulder whereby the pressure of said spring is taken by said shoulder rather than by said toothed member.

5. In a device of the class described the combination with a casing having connected chambers, of a rotatable toothed member in each chamber substantially contiguous the periphery thereof and meshing with the toothed member in another chamber, fluid inlet and outlet ports substantially opposite one another and the meshing portions of said toothed members and each port common to both toothed members, a longitudinal counterbalancing port in the periphery of each chamber substantially opposite the inlet port, and another longitudinal counterbalancing port in each chamber substantially opposite the outlet port, a fluid passage within the casing connecting the inlet port with its counterbalancing ports, another fluid passage within the casing connecting the outlet port with its counterbalancing ports, said counterbalancing ports each being of a size to substantially counterbalance the pressure on the toothed members due to said inlet and outlet ports, said counterbalancing ports in each chamber being of such width that the angular separation of any two adjacent ports in each chamber is not less than two nor more than three circular tooth pitches.

6. In a device of the class described the combination with a casing having connected chambers, of a rotatable toothed member in each chamber substantially contiguous the periphery thereof and meshing with the toothed member in another chamber, fluid inlet and outlet ports or pumping ports substantially opposite one another and the meshing portions of said toothed members, each pumping port being common to both toothed members, a longitudinal counterbalancing port in the periphery of each chamber substantially opposite the inlet port, and another longitudinal counterbalancing port in each chamber substantially opposite the outlet port, a fluid passage within the casing connecting the inlet port with its counterbalancing ports, another fluid passage within the casing connecting the outlet port with its counterbalancing ports, said counterbalancing ports each being of a size to substantially counterbalance the pressure on the toothed members due to said inlet and outlet ports, said counterbalancing ports in each chamber being of a width less than its connected pumping port by not more than one circular tooth pitch and less than the angular separation of any two adjacent ports.

7. In a device of the class described the combination with a casing having connected chambers, of a rotatable toothed member in each chamber substantially contiguous the periphery thereof and meshing with the toothed member in another chamber, fluid inlet and outlet ports substantially opposite one another and the meshing portions of said toothed members and each port common to both toothed members, a longitudinal counterbalancing port in the periphery of each chamber substantially opposite the inlet port, and another longitudinal counterbalancing port in each chamber substantially opposite the outlet port, a fluid passage within the casing connecting the inlet port with its counterbalancing ports, another fluid passage within the casing connecting the outlet port with its counterbalancing ports, said counterbalancing ports each being of a size to substantially counterbalance the pressure on the toothed members due to said inlet and outlet ports, said counterbalancing ports in each chamber being angularly separated by an amount equal to substantially two circular tooth pitches plus the width of a tooth edge.

8. In a device of the class described the combination with a casing having connected chambers, of a rotatable toothed member in each chamber substantially contiguous the periphery thereof and meshing with the toothed member in another chamber, fluid inlet and outlet ports substantially opposite one another and the meshing portions of said toothed members and each port common to both toothed members, a longitudinal counterbalancing port in the periphery of each chamber substantially opposite the inlet port, and another longitudinal counterbalancing port in each chamber substantially opposite the outlet port, a fluid passage connecting the inlet port with its counterbalancing ports, another fluid passage connecting the outlet port with its counterbalancing ports, a rotatable shaft on which the toothed member is mounted in one chamber, rotary abutment members secured on said shaft substantially contiguous said toothed member, a stationary shaft on which is mounted the meshing toothed member in another chamber, stationary abutments secured on said stationary shaft substantially contiguous and toothed member carried thereby, said toothed members, abutments and abutment members and their supporting shafts being longitudinally shiftable to at least a limited extent within said chambers.

9. In a device of the class described the combination with a casing having connected chambers, of a rotatable toothed member in each chamber substantially contiguous the periphery thereof and meshing with the toothed member in another chamber, fluid inlet and outlet ports or pumping ports substantially opposite one another and the meshing portions of said toothed members, each pumping port being common to both toothed members, a longitudinal counterbalancing port in the periphery of each chamber substantially opposite the inlet port, and another longitudinal counterbalancing port in each chamber substantially opposite the outlet port, a fluid passage connecting the inlet port with its counterbalancing ports, another fluid passage connecting the outlet port with its counterbalancing ports, at least one of the toothed members being mounted on a stationary shaft and provided with supplemental counterbalancing areas formed by slots in said stationary shaft and between the shaft and toothed member, and passages connecting each supplemental counterbalancing area with its pumping port.

10. In a device of the class described the combination with a casing having casing parts assembled to join connected chambers, said casing parts having mating faces secured together with a sealed fit, of a rotatable toothed member in each chamber substantially contiguous the periphery thereof and meshing with the toothed member in another chamber, fluid inlet and outlet ports substantially opposite one another at the meshing portions of said toothed members, each port being common to both toothed members, a longitudinal counterbalancing port in the periphery of each chamber substantially opposite the inlet port, and another longitudinal counterbalancing port in each chamber substantially opposite the outlet port, a fluid passage connecting the inlet port with its counterbalancing ports, another fluid passage connecting the outlet port with its counterbalancing ports, at least one passage for the transmission of counterbalancing fluid pressure being an open channel formed directly in the surface of one of the mating faces and closed by the other of the mating faces when the parts of the casing are secured together.

11. In a device of the class described, the combination with a casing having connected chambers, of a rotary shaft and toothed member in one chamber, rotatable abutment members secured to and rotatable with said shaft substantially contiguous the ends of the toothed member and within said chamber, a second shaft on which is mounted a second rotatable toothed member in another chamber, a stationary abutment received by said second shaft substantially contiguous each end of said second-mentioned toothed member, the stationary abutments being recessed to receive the rotatable abutment members, said abutment and abutment members each being of a diameter to close the spaces between the teeth of the contiguous toothed member, the abutment and abutment members at least at one end of the toothed members being adapted for limited axial movement within said chambers.

12. In a device of the class described, the combination with a casing having connected chambers, of a rotary shaft and toothed member in one chamber, a rotatable abutment member secured to and rotatable with said shaft substantially contiguous one end of the toothed member and within said chamber, a second shaft carrying a second rotatable toothed member in another chamber, a stationary abutment substantially contiguous one end of the second toothed member, the stationary abutment being recessed to receive the rotatable abutment, said abutment and abutment member being of a diameter to close the spaces between the teeth of the contiguous toothed member, said abutment and abutment member being adapted for limited axial movement within said chambers.

13. In a device of the class described, the combination with a casing having connected chambers, of a rotary shaft and toothed member in one chamber, a rotatable abutment member secured to and rotatable with said shaft substantially contiguous one end of the toothed member and within said chamber, a second shaft carrying a second rotatable toothed member in another chamber, a stationary abutment substantially contiguous one end of the second toothed member, the stationary abutment being recessed to receive the rotatable abutment, said abutment and abutment member being of a diameter to close the spaces between the teeth of the contiguous toothed member, said abutment and abutment member being adapted for limited axial movement within said chambers, and resilient means urging said stationary abutment axially toward the contiguous toothed member, whereby excess pressure may be relieved by axial movement of the abutment against the resilient means.

14. In a device of the class described, the combination with a casing having connected chambers, of a rotary shaft and toothed member in one chamber, a rotatable abutment member secured to and rotatable with said shaft substantially contiguous one end of the toothed member and within said chamber, a second shaft carrying a second rotatable toothed member in another chamber, a stationary abutment substantially contiguous one end of the second toothed member, the stationary abutment being recessed to receive the rotatable abutment, said abutment and abutment member being of a diameter to close the spaces between the teeth of the contiguous toothed member, said abutment and abutment member being adapted for limited axial movement within said chambers, resilient means urging said stationary abutment axially toward the contiguous toothed member, whereby excess pressure may be relieved by axial movement of the abutment against the resilient means, and additional motion limiting means for limiting the axial movement of the abutment toward the toothed member in order to prevent excessive frictional engagement with the end of the toothed member.

15. In a device of the class described the combination with a casing having connected chambers, said casing including an end wall, of a rotatable toothed member in each chamber, said members meshing with one another, fluid pumping ports opposite one another at the meshing portions of said toothed members, a counterbalancing port in each chamber substantially opposite a pumping port, a passage connecting the pumping port with its counterbalancing ports, said passage comprising an open channel formed directly on the inner surface of the end wall, said channel being closed by an adjacent part of the pump structure to form the desired passage.

16. In a device of the class described, the combination with a casing having connected chambers, of a rotatable toothed member in one chamber, a second rotatable toothed member in the second chamber, said members meshing with one another, a non-rotatable abutment in the second chamber at one end of the second toothed member, said abutment being of a diameter to close the spaces between the teeth of the second toothed member and being arranged for limited axial sliding movement within the second chamber, and resilient means urging said abutment axially toward the second toothed member, whereby excess pressure may be relieved by axial movement of the abutment against the resilient means, and additional motion limiting means for limiting the axial movement of the abutment toward the second toothed member in order to prevent excessive frictional engagement with the end of the toothed member.

17. In a device of the class described, the combination with a casing having connected chambers, of a rotatable toothed member in one chamber, a second rotatable toothed member in the second chamber, said members meshing with one another, an abutment in the second chamber at one end of the second toothed member, said abutment being of the same diameter as the second toothed member and being arranged for limited axial sliding movement within the second chamber, resilient means urging said abutment axially toward the second toothed member, whereby excess pressure may be relieved by axial movement of the abutment against the resilient means, said abutment being of substantial width in an axial direction to avoid tilting within the chamber, the portion of the chamber which slidably receives the abutment being a direct continuation of the chamber and having the same diameter so that it may be machined in the same operations, and additional motion limiting means for limiting the axial movement of the abutment toward the second toothed member in order to prevent excessive frictional engagement with the end of the toothed member.

18. In a device of the class described, the combination with a casing having connected chambers, of a rotatable toothed member in one chamber, a second rotatable toothed member in the second chamber, said members meshing with one another, an abutment in the second chamber at one end of the second toothed member, said abutment being of a diameter to close the spaces between the teeth of the second toothed member and being arranged for limited axial sliding movement within the second chamber, resilient means urging said abutment axially toward the second toothed member, whereby excess pressure may be relieved by axial movement of the abutment against the resilient means, fluid pumping ports substantially opposite one another at the meshing portions of said toothed members, and radial counterbalancing ports located diametrically opposite the pumping ports and communicating with said respective diametrically opposite pumping ports so that the pressures exerted at diametrically opposite points of the abutment are alike and therefore have no tendency to tilt the abutment.

GUSTAVE A. UNGAR.